INVENTOR.
ARDEN SHER
BY
ATTORNEY

United States Patent Office 3,452,295
Patented June 24, 1969

3,452,295
GAS LASER DISCHARGE TUBE HAVING INSULATOR SHIELDS
Arden Sher, Sunnyvale, Calif., assignor to Varian Associates, Palo Alto, Calif., a corporation of California
Filed Aug. 4, 1966, Ser. No. 570,363
Int. Cl. H01s 3/22
U.S. Cl. 331—94.5                           7 Claims This invention relates to optical masers or lasers, and in particular to gas discharge laser tubes.

Maser devices are used as amplifiers of electromagnetic wave energy. The amplification is achieved by stimulated emission from a negative temperature medium formed by a population inversion in a certain energy level system. Optical masers, or lasers as they are now known, typically employ reflective surfaces so positioned with respect to each other and with respect to the negative temperature medium, that light waves pass through the active medium as they reciprocate between the reflective surfaces. While passing through the active laser medium, the wave is amplified by interaction with the excited atoms or molecules therein.

The population or energy level inversion necessary for laser action is accomplished in gaseous lasers by subjecting an active gaseous medium to an electric discharge. The gas discharge is excited in some devices by direct current energized electrodes positioned within the laser tube, and in others by radio-frequency energized electrodes mounted outside the tube. The preferred applicability of the present invention is with the D.C. energized, internal electrode laser tube.

Such a laser tube is described in copending patent application Ser. No. 467,825, filed June 24, 1965, and assigned to the same assignee. In some embodiments of this type tube, sections of ceramic are joined to metal by brazing. However, one problem that is encountered with structures of this type is the appearance of white hot spots at the brazing areas which connect the ceramic to the metal sections. These hot spots generally occur when increased current is drawn at each section. Such hot spots particularly appear at the anode side of the cathode section. The appearance of such spots are accompanied by bursts of current that cause noise and interfere with experiments, such as may be conducted in spectroscopy. Also, sputtering occurs which leads to shortening of the life of the laser tube and deterioration of performance.

An object of this invention is to provide an improved gas discharge laser tube with improved life expectancy and better performance.

According to this invention a gas laser discharge tube is formed with alternate metal and ceramic sections brazed together, the metal sections including anode and cathode electrodes. A protrusion extends from the cathode electrode in the direction of the anode to protect the brazed joint between the cathode section and the ceramic section adjacent to the cathode. The protrusion or extension is annular and concentric with the inner wall of the ceramic section to afford unimpeded flow of current between the anode and cathode electrodes. In this manner, a stable long lifetime gas laser tube providing improved performance is realized.

The invention will be described in greater detail with reference to the drawing in which.

Similar numerals refer to similar elements throughout the drawing.

Figure 1:
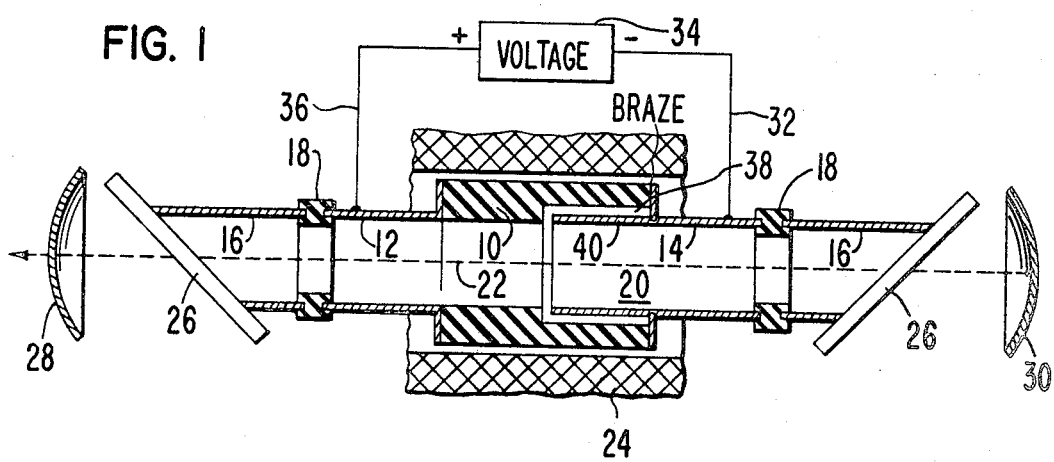
FIG. 1 is a cross sectional view, partly broken away, of a gas laser tube incorporating the invention.

In FIG. 1, a gas discharge laser tube includes a cylindrical central section 10 composed of an electrical insulation material, such as ceramic. Straddling the central section 10 are an annular anode electrode section 12 and an annular cathode electrode section 14, both formed from an electrically conductive material such as Kovar. Hollow end sections 16, which may be made from a metallic material, are connected to and insulated from the anode section 12 and the cathode section 14 by annular spacer sections 18 composed of an electrical insulation material such as ceramic. The individual sections 10, 12, 14, 16 and 18 have a circular cross section and are connected in vacuum tight fashion, by brazing, in coaxial alignment thereby forming a hollow laser envelope 20 having a primary central axis 22. A solenoid 24 which is connected to a source of power (not shown) surrounds the hollow envelope 20 for magnetic confinement of the discharge energy.

The ends of the hollow elongated envelope 20 are vacuum tightly sealed by elliptical or circular output windows 26 attached to the ends of the end sections 16. The output windows 26 are made of a high quality homogeneous optical glass, of which Corning No. 7056 is an example, and are inclined at an angle $\phi$ to the primary envelope axis 22, where $\phi$ is the complement of the angle $\theta$ known as the Brewster angle. The Brewster angle $\theta$ is given by the relation $\theta = \tan^{-1} n$ where $n$ is the refractive index associated with the lens material used for the output windows.

Straddling the hollow envelope 20 are the optical reflectors 28, 30 having opposing confocal concave surfaces aligned with the central axis 22. The reflective elements 28, 30 are made, for example by suitable coating, to be highly selectively reflective of energy of a desired wavelength. The reflector 28, however, is constructed by well known methods so as to transmit some of the energy at the desired wavelength. The degree of transmission can be, for example, 1 to 5 percent. It is understood that the reflectors 28 and 30 may, in alternative embodiments, not shown, form part of the envelope structure 20, or may be mounted within the envelope.

An electrical supply lead 32 connects the negative terminal of D.C. voltage source 34 to the cathode electrode section 14 and an electrical supply lead 36 connects the positive terminal of D.C. voltage source 34 to the anode electrode section 12.

Contained at reduced pressure within the elongated hollow envelope 20 is a suitable active gaseous medium which is susceptible to a population inversion. Advantageously, the energy level system of the gaseous laser medium includes a pair of levels between which the population inversion may be at least intermittently established and wherein the return of this system to normal equilibrium upon proper stimulation is accompanied by the emission of electromagnetic wave energy in the optical frequency range. Such a medium is obtained, for example, with a mixture of helium and neon gases.

In the operation of the gas laser tube shown in FIG. 1 a voltage of, for example, 300 volts is applied by the D.C. voltage source 34 between the anode electrode section 12 and the cathode electrode section 14 producing a gas discharge within the hollow envelope 20. By suitably selecting the lengths of the cathode electrode section 14 and the elongated central ceramic section 10 the discharge can be operated in either the hollow cathode or positive column mode.

In the hollow cathode case, the discharge consists primarily of the negative glow region inside the hollow cathode electrode 14 and a relatively short positive column is present. In this case the metal cathode section 14 is long, e.g., 10 inches and the ceramic section 10 is short, e.g., 1 inch. It is also possible to have one anode section 12 and several shorter metal-to-ceramic sections like 10 and 14 connected together. In this case the driving voltage can be applied between the anode and the cathode, which is the last metal section at the opposite end of the tube, or the voltage profile in the tube can be controlled by voltages applied to each metal section of the composite metal-to-ceramic sections.

In the positive column case, the positive column is the longest region of the discharge. The length of the positive column is nearly the same as the length of the ceramic section 10. Hence, for this mode of operation the ceramic section 10 may typically be 10 to 30 inches, and the cathode and anode metal sections 2 inches in length.

During the helium-neon gas discharge, the metastable states of helium become populated in substantial numbers. Energy is then transferred by collision between the helium metastables and the unexcited neon atoms and the 25 states of neon are selectively populated. These neon atoms can then be stimulated to radiate energy in a continuous stream which is reciprocated between the reflectors 28, 30 growing in intensity on each traversal of the active laser medium. A portion of the reciprocating energy leaves the system through the partially transparent reflector 28. The escaping energy is then used in any suitable application.

Thus, the present invention provides a gas discharge laser tube which makes use of a highly efficient gas discharge. Furthermore, the utilization of the discharge inducing electrodes as a part of the laser envelope provides a tube which is extremely simple and rugged. The requirement for complicated and typically fragile electrode supports within the tube envelope is eliminated. In addition, the high thermal conductivity exhibited by the metal and ceramic envelope wall provides improved heat exchange, permits lower tube operating temperatures, and greatly extends the life expectancy of the device.

Figure 2:
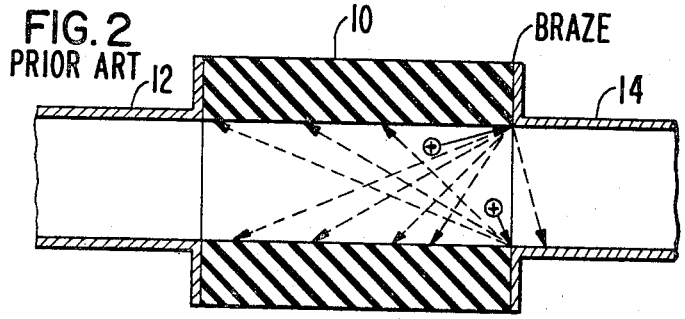
FIG. 2 is an enlarged sectional view of a portion of the gas laser tube, constructed in accordance with the prior art.

In prior embodiments of the gas laser discharge tube such as described in the aforementioned patent application Ser. No. 467,825, the cathode electrode 14 was brazed to the ceramic body 10, as shown in FIG. 2. As stated before, high currents tend to produce hot spots at the brazed portions with detrimental results.

Figure 3:
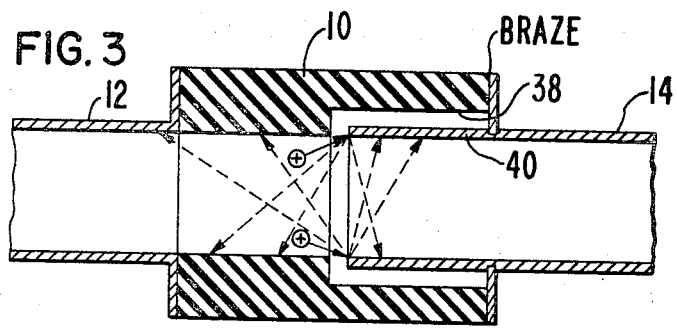
FIG. 3 is an enlarged sectional view of the novel structure of this invention that is utilized with the gas laser tube of FIG. 1.

In accordance with the present invention (see FIG. 3), a notch 38 of increased inside diameter is formed in the central ceramic body 10, adjacent to the cathode portion facing the anode electrode 12, as shown in FIGS. 1 and 3. A shield 40 is formed by an axial protrusion or extension of the cathode 14, and is disposed along the inside of the notch portion 38, forming an overlap. The overlap or shield 40 is in register and coaxially aligned with the inner periphery of the annular ceramic section 10, and with the anode and cathode electrodes. The shield 40 serves to protect the brazed joint portion between the cathode 14 and the ceramic section 10 from direct ion bombardment. Also, the novel structure prevents the collection of sputtered metal on the shielded notched portion 38 of the insulator 10 which sputtered metal otherwise tends to form a current link between metal sections. This current link operates like a fuze and is burned away by the current conducted therethrough. However, the link merely keeps moving around the inside surface of the insulator 10 adjacent the metal-to-ceramic joint, thus, producing overheating of the joint and ultimately fracture thereof and failure of the laser.

Thus, the operating life of the laser is greatly extended by the provision of the shield 40 as it prevents ion bombardment of the metal-to-ceramic joint and prevents formation of leakage current paths across the insulator 10 which can cause failure of the joint.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gas laser apparatus including means forming an elongated tubular gas tight envelope for containing a gas laser discharge column within a gas fill inside of said envelope, means forming a pair of electrodes axially spaced apart of said elongated tubular envelope one of said electrodes adapted to operate at anode voltage and the other adapted to operate in use at a voltage negative with respect to the anode voltage, for exciting the gas laser discharge column in the region therebetween, means forming a dielectric insulator assembly disposed intermediate said pair of electrodes and defining a portion of said tubular envelope, means forming a metal-to-dielectric gas tight joint between said insulator and a metallic portion of said envelope which envelope portion is operated in use at a potential negative with respect to the anode voltage, and means forming a shield disposed within said envelope adjacent said metal-to-dielectric joint for shielding said joint from bombardment by ions originating in the laser discharge column by receiving such ions incident thereon, and said shield also serving to shield at least a portion of the length of the inside surface of said insulator from sputtered metallic particles sputtered off ion bombarded surfaces within said tubular envelope, whereby the operating life of the laser apparatus is extended as compared to similar laser apparatus without said shield means.

2. The apparatus of claim 1, wherein said pair of electrodes are coaxially disposed metallic tubes.

3. The apparatus of claim 1, wherein said shield includes an axially directed metallic portion extending from the region defined by said metal-to-dielectric joint toward said electrode which is operated at anode voltage, and said metallic extension portion being disposed inbetween said laser discharge column and said shielded portion of said insulator.

4. The apparatus of claim 1, wherein said insulator is a tubular dielectric member joined by gas tight metal-to-dielectric joints at both ends to adjoining metallic portions of said elongated envelope, and wherein a portion of said insulator adjacent said shielded joint has an enlarged inside diameter relative to another portion of said insulator, and wherein said shield extends axially of said insulator adjacent said enlarged portion thereof for shielding said enlarged portion from sputtered metallic particles.

5. The apparatus of claim 4, wherein said insulator is a tubular ceramic member and said shielded joint is a brazed ceramic-to-metal joint.

6. The apparatus of claim 5, including means for applying a D.C. voltage between said pair of electrodes for energizing the laser discharge column.

7. The apparatus of claim 6 wherein said axially extending shield is a tubular metallic member having an inside diameter substantially equal to the inside diameter of the nonenlarged portion of said insulator, whereby the bore of said tubular envelope in the region of said insulator is of substantially uniform dimensions.

References Cited

UNITED STATES PATENTS 2,162,505  6/1939  James et al. _____ 331—94.5

JOHN KOMINSKI, *Primary Examiner.*